Dec. 21, 1926.  
H. H. FRAUENSTEIN  
PHOTOGRAPHIC CAMERA  
Filed Sept. 29, 1924   4 Sheets-Sheet 1

1,611,344

Inventor:
Hermann H. Frauenstein
by Reinhaur
Atty.

Dec. 21, 1926.　　　　　　　　　　　　　　　　　　1,611,344
H. H. FRAUENSTEIN
PHOTOGRAPHIC CAMERA
Filed Sept. 29, 1924　　　4 Sheets-Sheet 3

Inventor:
Hermann H. Frauenstein
by Kreuchauff
Atty.

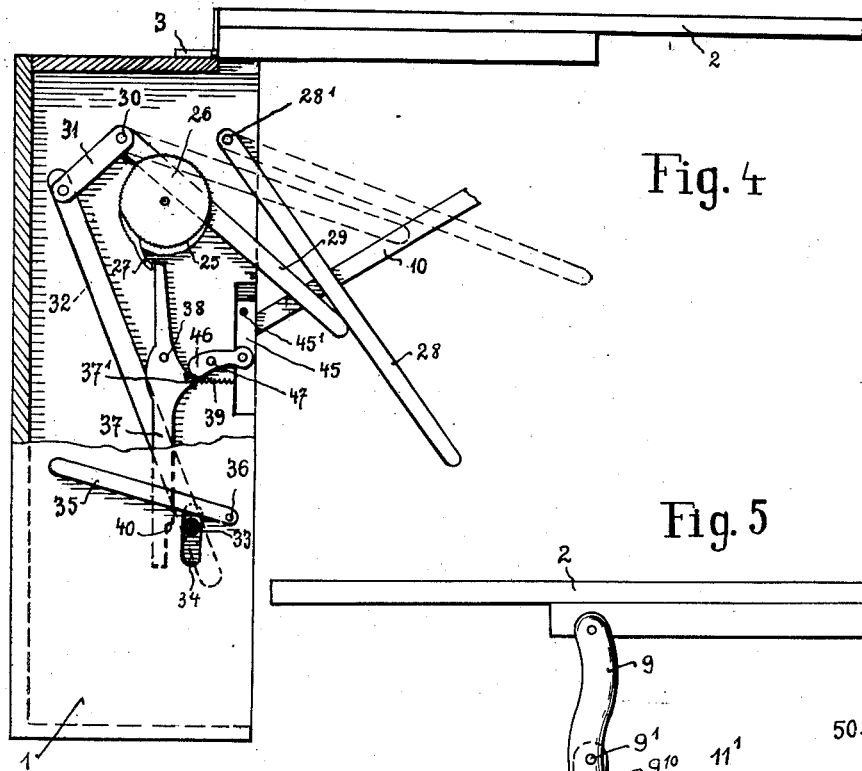

Patented Dec. 21, 1926.

1,611,344

UNITED STATES PATENT OFFICE.

HERMANN HUGO FRAUENSTEIN, OF DRESDEN, GERMANY, ASSIGNOR TO THE FIRM: IHAGEE KAMERAWERK STEENBERGEN & CO., OF DRESDEN, GERMANY.

PHOTOGRAPHIC CAMERA.

Application filed September 29, 1924, Serial No. 740,661, and in Germany February 26, 1924.

My invention relates to a reflex-camera and more particularly to a folding camera in which the lens board is automatically shifted when the camera is being folded.

It is an object of my invention to provide a camera of the kind described in which the bellows is adapted to be folded on diagonal lines and in which the unfolding of the bellows is effected by means comprising a pair of double-armed levers so as to hold the camera front parallel to the case of the camera in any position during the unfolding operation, and to provide a lens board which is movable on said camera front and is operatively connected to one of said levers so as to be displaced in accordance with the various stages of the folding operation.

It is another object of my invention to provide a frame for supporting the mirror in its operative position at an angle of exactly 45 degrees, means being also provided for moving the mirror out clear of the optical axis when operating the trigger which actuates the shutter. I also provide mechanism for locking the mirror in its raised position and for automatically unlocking it so as to move it out of the way when the camera is being folded.

In the drawings affixed to this specification and forming part thereof a camera embodying my invention is illustrated diagrammatically by way of example.

In the drawings—

Fig. 4 is an elevation of the mirror operating mechanism, partly in section.

Fig. 5 is a similar view showing the position of the mirror frame in relation to the camera front.

Fig. 6 is an isometric view of part of the mirror frame.

Figure 1:
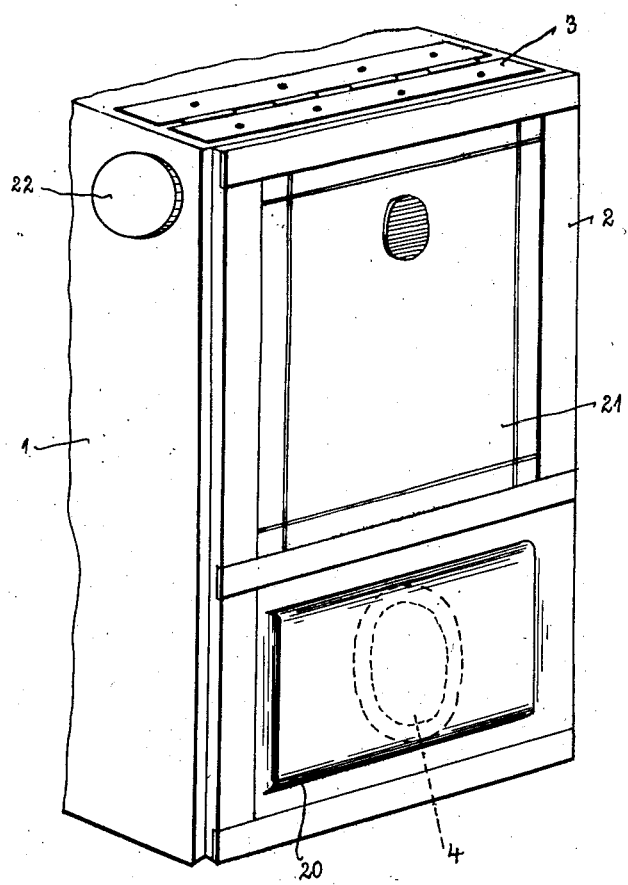
Fig. 1 is an isometric view of the camera in folded condition.
Figure 2:
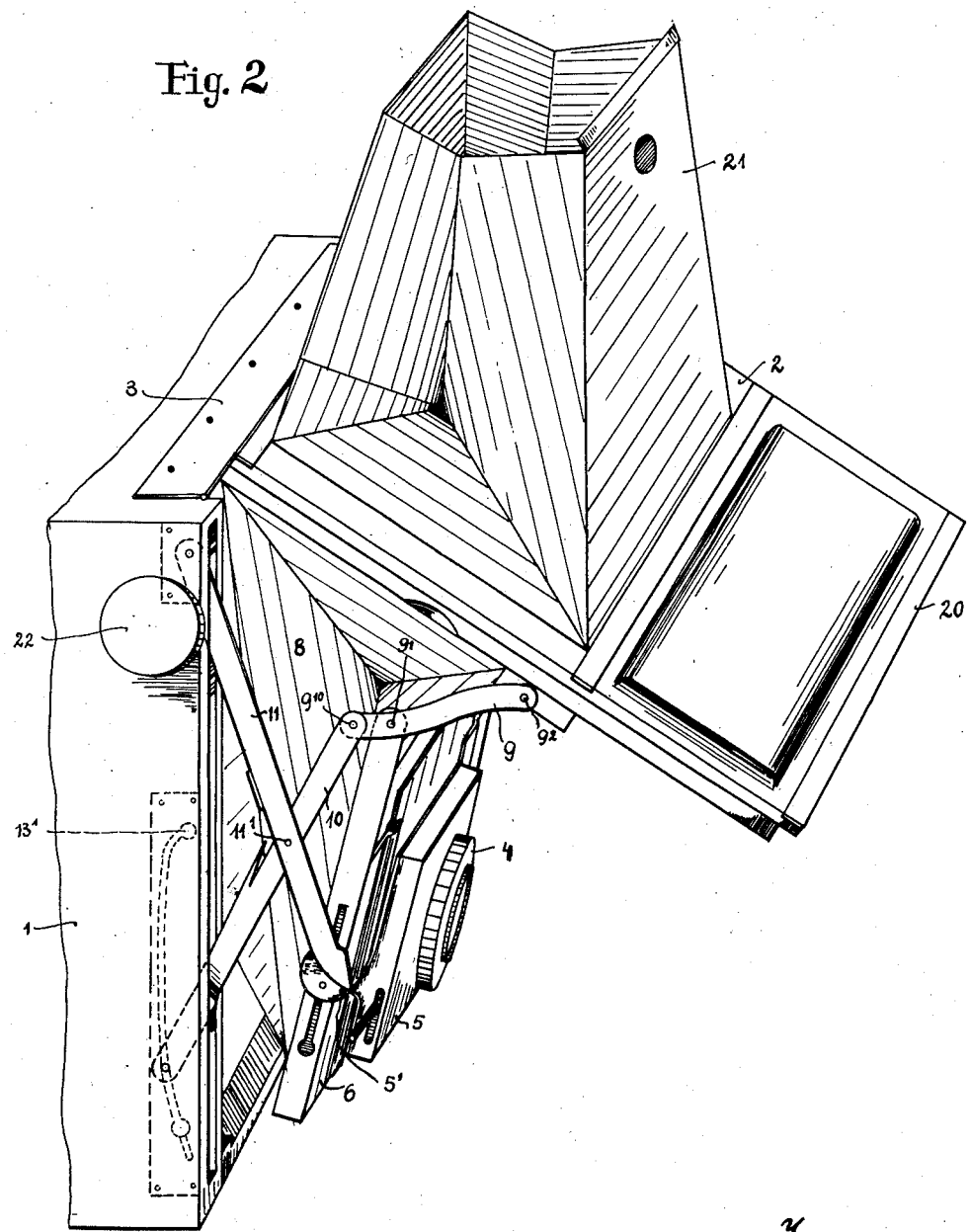
Fig. 2 is a similar view showing the camera partly opened.

A frame 2 supporting a ground glass screen (not visible), a focussing hood 21 above this screen and a sky shade 20, is hinged to the case 1 of the camera at 3. The lens 4 which, when the camera is closed, is protected by the folded-down sky shade 20 as will be seen in Fig. 1, is secured to a lens board 5, which is guided in slots 7 at the camera front 6 and provided with a lug 5' adapted to be engaged by the end of a strut 11. A bellows 8 is secured to the casing 1, the frame 2 and the camera front 6.

The correct relative position of the several parts of the camera is brought about by means of links and levers 9, 10 and 11. A double armed lever 9 is fulcrumed to the camera front 6 at 9' its ends being connected with the frame 2 at $9^2$ and a strut 10 at $9^{10}$, respectively. The strut 10 is pivotally connected at 11' with the strut 11 which is fulcrumed on the case 1 at 14 and carries on its free end a pin 15 engaging a slot 16 at the side of the camera front 6.

Figure 3:
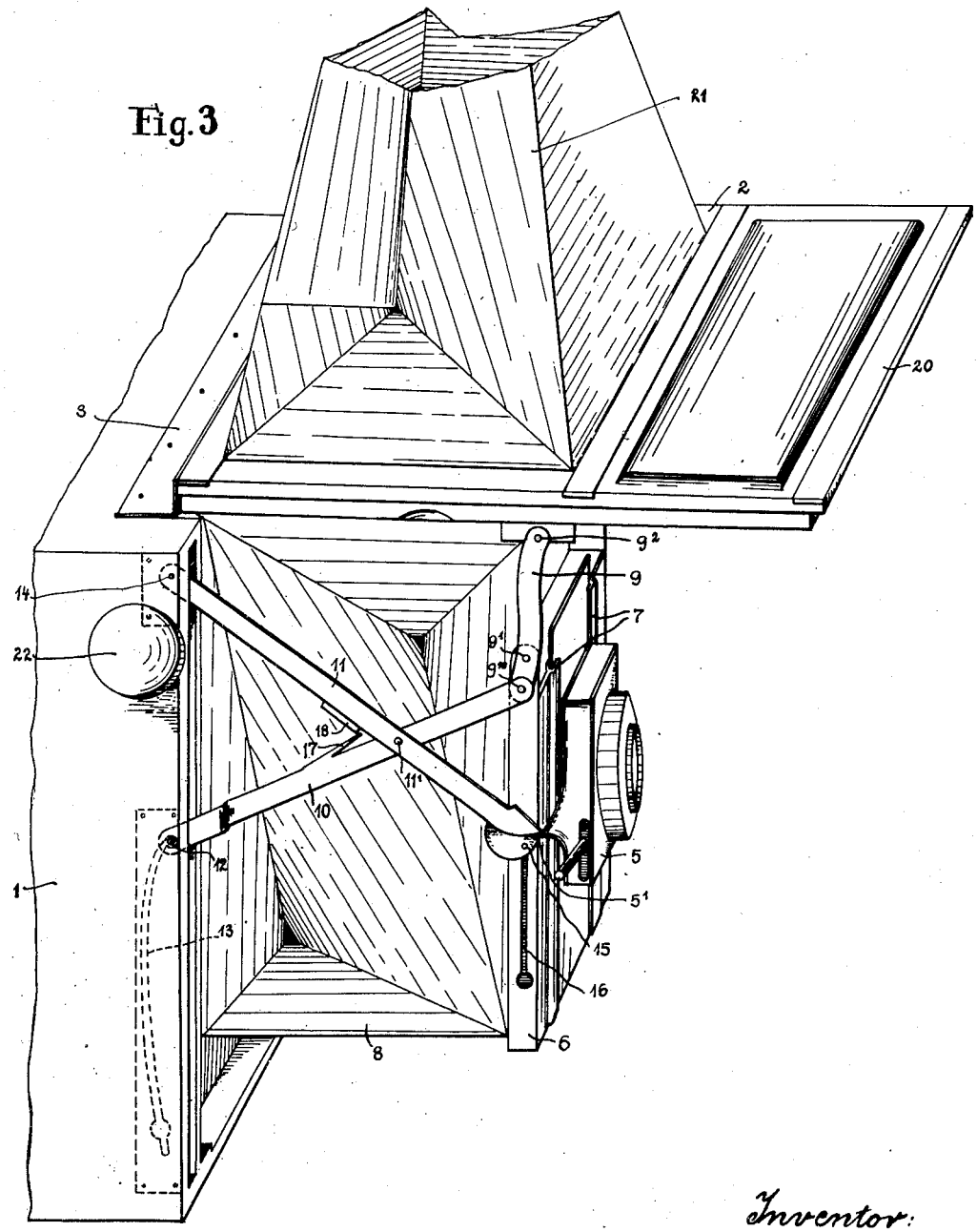
Fig. 3 is a similar view showing the camera ready for use.

The free end of strut 10 carries a pin 12 engaging a curved slot 13 in the camera case, a substantially circular extension 13' at its upper end extending rearwards so as to lock the pin 12 when the camera is opened as shown in Fig. 3. Pin 12 is held in the extension 13' by means of a spring 17 secured to the strut 10 and adapted to be engaged by a shoulder 18 on the strut 11 when the camera is open. The reaction of the spring 17 holds the pin 12 firmly in the extension.

The inner ends of the struts 10 and 11 are concealed in a recess 1' of the casing 1 which also receives part of the mechanism shown in Fig. 4. Obviously the struts and other parts may also be arranged in any other convenient way, and the folding and opening mechanism will preferably be duplicated on the other side of the camera.

When the camera shall be folded, pin 12 is removed from the extension 13' against the reaction of the spring 17 by an upward pressure exerted on the strut 11, and is then depressed so that it enters the slot 13 and the camera can be folded by swinging frame 2 down onto the front of the case 1.

The mirror 28 is fulcrumed in the case 1 at 28' and tends to move downwards into operative position by gravity or under the action of a spring (not shown). It is supported by a frame comprising two bars 48, one of which is shown separately in Fig. 6, this frame being designed to support the mirror exactly at an angle α of 45° to the optical axis XX of the camera.

The bars 48 are pivoted at one end to the camera front 6 at 48' and are guided in slotted guides 50 at the camera case 1 by pins 49. The mirror 28 is supported on lugs 51 projecting on the inside of each bar 48. A lever 29 for raising the mirror is fulcrumed in the case 1 at 30, a lever 31 being rigidly secured to the pivot pin 30 and a link 32 pivoted to the free end of this lever. A dog 33 on link 32 projects through a slot 34 in the camera case 1. A trigger 35 fulcrumed on the case at 36 serves for operating the shutter which may be a focal plane shutter. The mechanism by which the shutter is operated is of usual construction and therefore not described nor illustrated. It will be understood that the trigger 35 is disposed on the outside of the camera, not inside as might be inferred from Fig. 4 where it is shown in full lines for the sake of convenience.

When an exposure shall be made, the trigger 35 is depressed and the shutter is operated for instantaneous or time exposure. The trigger 35 engages the dog 33 and moves the link 32 downwards, raising the mirror 28 by means of the levers 31 and 29 which are fulcrumed in the case 1 at 30. On the trigger being released the mirror would return to its initial position if it were not locked by a catch 37 fulcrumed on the case 1 at 38 and provided with a pull-back spring 39. Under the action of this spring a shoulder 40 at the lower end of the catch 37 engages the dog 33 of the link 32 and the mirror is held in its raised position until it is released by the tooth 27 of the ratchet wheel 25.

The shutter (not shown) is wound by means of the key 22. Two ratchet wheels 25 and 26 are secured on the key shaft, these wheels 25 and 26 being shown out of register in Fig. 4 for the sake of clearness but being coaxial in reality. The inner wheel 25 has a tooth 27 for engaging the catch 37. Each wheel co-operates with one blind of the shutter.

When an exposure has been made the wheel 25 rotates clockwise and its tooth 27 causes the catch 37 to release the dog 33 of the link so that the mirror returns to its initial position and the camera is ready for focussing.

It is important that the mirror be disposed of before the camera is folded as any attempt to fold the camera while the mirror is locked in its operative position, would cause it to be damaged. In order to prevent this, a slide 45 arranged in a recess of the camera case is provided with a pin 45' so as to be raised by the adjacent strut 10 or 10' respectively.

In Fig. 4 the strut 10 which operates the slide 45 is not shown, being mounted in front of the mechanism, but the strut 10' shown is in exactly the same position.

If it is desired to fold the camera, one of the struts 10 or 10' must be raised slightly and, in being so raised, it engages the pin 45' and raises the slide 45. A double-armed lever 46 fulcrumed on the casing 1 at 47 is connected with the slide 45 at one end, while its other end co-operates with a cam 37' of the catch 37. It will be understood that on raising the slide 45 the end of the lever 46 will engage the cam 37' and force the catch 37 to the left, thereby releasing the dog 33 and allowing the mirror to drop as described.

In a camera according to my invention the bellows can be folded diagonally, whereby the camera is made very compact, so that it combines a very simple and strong construction with small bulk while preserving all the advantages of the reflex camera. Due to its simplicity the operation of the camera is also very easy and reliable.

Another advantage of this camera is the movable lens board which allows the lens to be shielded by the frame 2 when the camera is folded. No dirt can get access to the lens nor can it be damaged while the camera is being handled. When the camera is open, the extension serves as a sky shade so that a separate shade can be dispensed with.

My invention provides an absolutely reliable operation of the mirror and prevents any accidents in case that the camera be folded while the mirror is still in its initial position. It is further important that the mirror be released when making time exposures.

I wish it to be understood that I do not desire to be limited to the exact details of construction shown and described, for obvious modifications will occur to a person skilled in the art.

I claim:

1. Folding reflex camera comprising a case, a focussing hood frame hinged to said case, a diagonally foldable bellows fixed to said case and to said frame, a camera front connected with said bellows, means comprising a pair of double armed levers pivotally connected with said case, said frame and said camera front respectively for guiding the latter and for holding it parallel to said case, when said frame is swung away from said case and a lens board movable on said camera front and operatively connected to one of said levers.

2. Folding reflex camera comprising a case, a focussing hood frame hinged to said case, a diagonally foldable bellows fixed to said case and to said frame, a camera front connected with said bellows, means pivotally connected with said case, said frame and said camera front respectively for guiding the latter and for holding it parallel to said case, when said frame is swung away from said case, a lens board movable on said camera front and operatively connected with said guiding means, and an extension on said frame placing itself in front of said lens board, when the camera is folded.

3. Folding reflex camera comprising a case, a focussing hood frame hinged to said case, a diagonally foldable bellows fixed to said case and to said frame, a camera front connected with said bellows, a pair of scissor-like connected levers, one being fulcrumed, the other being guided on said case and a third double armed lever pivoted to said camera front, said frame and the free end of said guided lever.

4. Folding reflex camera comprising a case, a focussing hood frame hinged to said case, a diagonally foldable bellows fixed to said case and to said frame, a camera front connected with said bellows, a pair of scissor-like connected levers, one being fulcrumed, the other being guided on said case and a third double armed lever pivoted to said camera front and having its longer arm pivotally connected to said frame, the shorter one to the free end of said guided lever.

5. Folding reflex camera comprising a case, a focussing hood frame hinged to said case, a diagonally foldable bellows fixed to said case and to said frame, a camera front connected with said bellows, a pair of scissor-like connected levers, one being fulcrumed, the other being guided on said case, a third double armed lever pivoted to said camera front and having its longer arm pivotally connected to said frame, the shorter one to the free end of said guided lever and a lens board movable on said camera front and operatively connected with the free end of said fulcrumed lever.

6. Folding reflex camera comprising a case, a focussing hood frame hinged to said case, a diagonally foldable bellows fixed to said case and to said frame, a camera front connected with said bellows, means pivotally connected with said case, said frame and said camera front respectively for guiding the latter and for holding it parallel to said case, when said frame is swung away from said case, a mirror hinged to said frame and a mirror lifting lever mounted on said frame for rocking motion.

7. Folding reflex camera comprising a case, a focussing hood frame hinged to said case, a diagonally foldable bellows fixed to said case and to said frame, a camera front connected with said bellows, means pivotally connected with said case, said frame and said camera front respectively for guiding the latter and for holding it parallel to said case, when said frame is swung away from said case, a mirror hinged to said frame, a mirror lifting lever mounted on said frame for rocking motion, a shutter, a trigger for operating said shutter and an operative connection between said trigger and said lifting lever.

8. Folding reflex camera comprising a case, a focussing hood frame hinged to said case, a diagonally foldable bellows fixed to said case and to said frame, a camera front connected with said bellows, means pivotally connected with said case, said frame and said camera front respectively for guiding the latter and for holding it parallel to said case, when said frame is swung away from said case, a mirror hinged to said frame, a mirror lifting lever mounted on said frame for rocking motion and a mirror support having one end guided in parallel with said case and the other end pivoted to said lens front.

9. Folding reflex camera comprising a case, a focussing hood frame hinged to said case, a diagonally foldable bellows fixed to said case and to said frame, a camera front connected with said bellows, means pivotally connected with said case, said frame and said lens front respectively for guiding the latter and for holding it parallel to said case, when said frame is swung away from said case, a mirror hinged to said frame, a mirror lifting lever mounted on said frame for rocking motion and means for locking said lifting lever in operative position.

10. Folding reflex camera comprising a case, a focussing hood frame hinged to said case, a diagonally foldable bellows fixed to said case and to said frame, a camera front connected with said bellows, means pivotally connected with said case, said frame and said lens front respectively for guiding the latter and for holding it parallel to said case, when said frame is swung away from said case, a mirror hinged to said frame, a mirror lifting lever mounted on said frame for rocking motion, means for locking said lifting lever in operative position, a shutter and means associated with said shutter for releasing said locking means.

11. Folding reflex camera comprising a case, a focussing hood frame hinged to said case, a diagonally foldable bellows fixed to said case and to said frame, a camera front connected with said bellows, means comprising a pair of double armed levers pivotally connected with said case, said frame and said camera front respectively for guiding the latter and for holding it parallel to said case, when said frame is swung away from said case and a lens board movable in parallel on said camera front and operatively connected to one of said levers.

In testimony whereof I affix my signature.

HERMANN HUGO FRAUENSTEIN.